US009575451B2

(12) United States Patent
Tsujita

(10) Patent No.: US 9,575,451 B2
(45) Date of Patent: Feb. 21, 2017

(54) SHEET PROCESSING APPARATUS AND CONTROL METHOD THEREFOR

(71) Applicant: CANON KABUSHIKI KAISHA, Tokyo (JP)

(72) Inventor: Kosuke Tsujita, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/719,721

(22) Filed: May 22, 2015

(65) Prior Publication Data

US 2015/0347065 A1 Dec. 3, 2015

(30) Foreign Application Priority Data

May 29, 2014 (JP) ................................ 2014-111274

(51) Int. Cl.
*G06F 3/12* (2006.01)
*G03G 15/00* (2006.01)

(52) U.S. Cl.
CPC ........ *G03G 15/6508* (2013.01); *G03G 15/502* (2013.01)

(58) Field of Classification Search
None
See application file for complete search history.

(56) References Cited

U.S. PATENT DOCUMENTS

2012/0236333 A1* 9/2012 Kiuchi .................. G03G 15/50 358/1.9
2013/0321865 A1* 12/2013 Hikichi ............. G06K 15/4065 358/1.15
2014/0078205 A1* 3/2014 Hayashi ................ B41J 11/003 347/16

FOREIGN PATENT DOCUMENTS

JP 2007-050980 A 3/2007

* cited by examiner

*Primary Examiner* — King Poon
*Assistant Examiner* — Andrew H Lam
(74) *Attorney, Agent, or Firm* — Fitzpatrick, Cella, Harper & Scinto

(57) ABSTRACT

A sheet processing apparatus includes a sheet storage unit configured to enable itself to be opened and closed and a display unit configured to display a screen for setting an attribute of a sheet stored in the sheet storage unit. Whether or not to display the screen for setting the sheet attribute is determined based on a remaining number of sheets obtained before the sheet storage unit is opened and a remaining number of sheets obtained after the sheet storage unit is closed. The setting screen is displayed on the display unit based on a result of determination.

11 Claims, 13 Drawing Sheets

UI FOR SETTING OUTPUT OF
PAPER TYPE REGISTRATION SCREEN

SCHEMATIC VIEW OF PART OF PRINTING APPARATUS

SCHEMATIC VIEW OF
PAPER FEED TRAY

BLOCK DIAGRAM OF HARDWARE CONTROL IN PRINTING APPARATUS

BLOCK DIAGRAM OF SOFTWARE MODULE CONFIGURATION OF PRINTING APPARATUS

STATES OF PAPER FEED TRAYS

601

| PAPER FEED TRAY | DEFAULT SCREEN OUTPUT | EXCEPTION (REMAINING NUMBER OF SHEETS) | EXCEPTION CONDITION (REMAINING NUMBER OF SHEETS) | EXCEPTION (PAPER SIZE) |
|---|---|---|---|---|
| 1 | ON | ACTIVE | INCREASE | NOT ACTIVE |
| 2 | OFF | NOT ACTIVE | INCREASE | ACTIVE |
| 3 | OFF | ACTIVE | DECREASE | ACTIVE |
| 4 | OFF | NOT ACTIVE | INCREASE | NOT ACTIVE |
| 5 | OFF | NOT ACTIVE | INCREASE | NOT ACTIVE |

REGISTRATION SCREEN OUTPUT DETERMINING TABLE

FIG.6

UI FOR SETTING OUTPUT OF
PAPER TYPE REGISTRATION SCREEN

UI FOR SETTING OUTPUT OF
PAPER TYPE REGISTRATION SCREEN

CONTROL OF OUTPUT OF PAPER TYPE REGISTRATION SCREEN

FIG.10
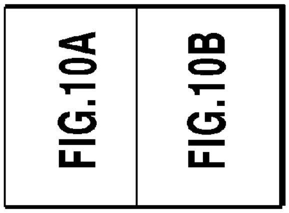
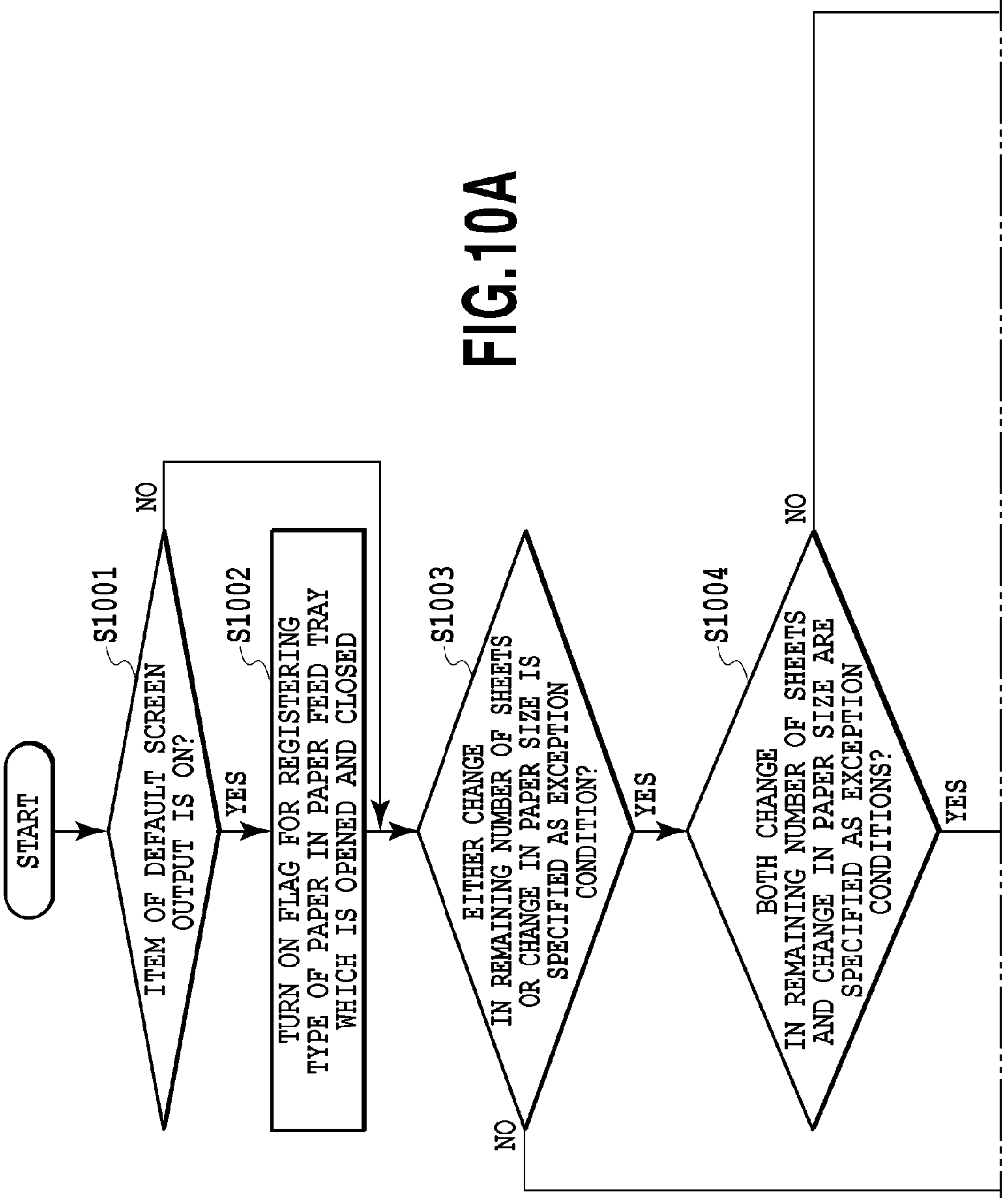
FIG.10A

PROCESSING FOR DETERMINING WHETHER OR NOT TO OUTPUT PAPER TYPE REGISTRATION SCREEN

UI FOR SETTING OUTPUT OF PAPER TYPE REGISTRATION SCREEN

SHEET PROCESSING APPARATUS AND CONTROL METHOD THEREFOR

BACKGROUND OF THE INVENTION

Field of the Invention

The present invention relates to a technique of outputting a message by checking the state of a paper feed tray of a printing apparatus.

Description of the Related Art

In recent years, as the performance of a printing apparatus improves, the number of the types of paper which the printing apparatus can handle increases. Paper is defined by its attributes indicative of the characteristics of the paper such as a size, a basis weight, and surface properties. It is necessary to register the types of paper used for printing in the printing apparatus beforehand, and set, for each paper feed tray, which type corresponds to paper set in the paper feed tray. This is because the printing apparatus performs, based on the set paper types, variable control such as adjustment of a paper conveyance speed, the temperature of a fixing unit, and a density at the time of printing.

In general, the types of paper are registered at the time of shipping as the specifications for which a maker of a printing apparatus considers a normal operating range. Further, a user can also register a new paper type. A user who sets paper in a paper feed tray registers the type of the paper set in the paper feed tray via a UI screen connected to the apparatus. Normally, for example, a list of paper types registered in the printing apparatus is displayed on the UI screen, and the type of paper set in the paper feed tray is selected from the list of paper types, whereby the type of paper is registered for the paper feed tray.

A paper replacement work is carried out in various applications or scenes such as a case where many sheets of paper are used in one job in print-on-demand (POD) and a case where an unspecified number of users use each type of paper as necessary in an office environment. Every time the paper replacement work is carried out, a user needs to operate the UI screen to output a paper type registration screen and to set a paper type. In a case where paper replacement is carried out frequently, not only a user load increases, but also a human error such as forgetting to set a paper type may arise.

Japanese Patent Laid-Open No. 2007-050980 proposes a method for reducing a user load for displaying a paper type registration screen on a UI screen and preventing forgetting to set a paper type by detecting that a paper feed tray is opened and outputting, to the UI screen, the paper type registration screen for the detected paper feed tray.

However, Japanese Patent Laid-Open No. 2007-050980 does not consider with what intention a user opens or closes the paper feed tray. For example, even in a case where the user opens the paper feed tray in order to add paper, the paper type registration screen is output to the UI screen in the technique disclosed in Japanese Patent Laid-Open No. 2007-050980. In this case, the user needs to delete the paper type registration screen displayed in the UI screen, and the user load increases.

SUMMARY OF THE INVENTION

In a first aspect of the present invention, there is provided a sheet processing apparatus comprising: a sheet storage unit configured to enable itself to be opened and closed; a display unit configured to display a screen for setting an attribute of a sheet stored in the sheet storage unit; an obtaining unit configured to obtain a remaining number of sheets stored in the sheet storage unit; a determining unit configured to determine whether or not to display the screen based on a remaining number of the sheets obtained before the sheet storage unit is opened and a remaining number of the sheets obtained after the sheet storage unit is closed; and a control unit configured to cause the setting screen to be displayed on the display unit based on a result of determination by the determining unit.

According to the present invention, an unnecessary paper registration screen is not to be output to the UI panel in case of registering a paper type.

Further features of the present invention will become apparent from the following description of exemplary embodiments (with reference to the attached drawings).

BRIEF DESCRIPTION OF THE DRAWINGS

FIG. 6 is a table for determining whether or not to output a paper type registration screen of the embodiment;

FIG. 10 is a diagram showing the relationship of FIGS. 10A and 10B;

FIGS. 10A and 10B totally show a flowchart showing processing for the printing apparatus of the embodiment.

DESCRIPTION OF THE EMBODIMENTS

Embodiments for carrying out the present invention will be described below with reference to the drawings. Incidentally, the configurations of the following embodiments are mere examples, and the present invention is not limited to the shown configurations.

<<Embodiment 1>>

In the present embodiment, explanation will be made on an information processing apparatus which outputs a message by checking the state of a paper feed tray of a printing apparatus. Incidentally, the information processing apparatus may be the printing apparatus itself or may be an information processing apparatus which is realized by picking out only a configuration for outputting a message in the printing apparatus. In the following embodiment, explanation will be made assuming that the information processing apparatus is the printing apparatus.

Figure 1:
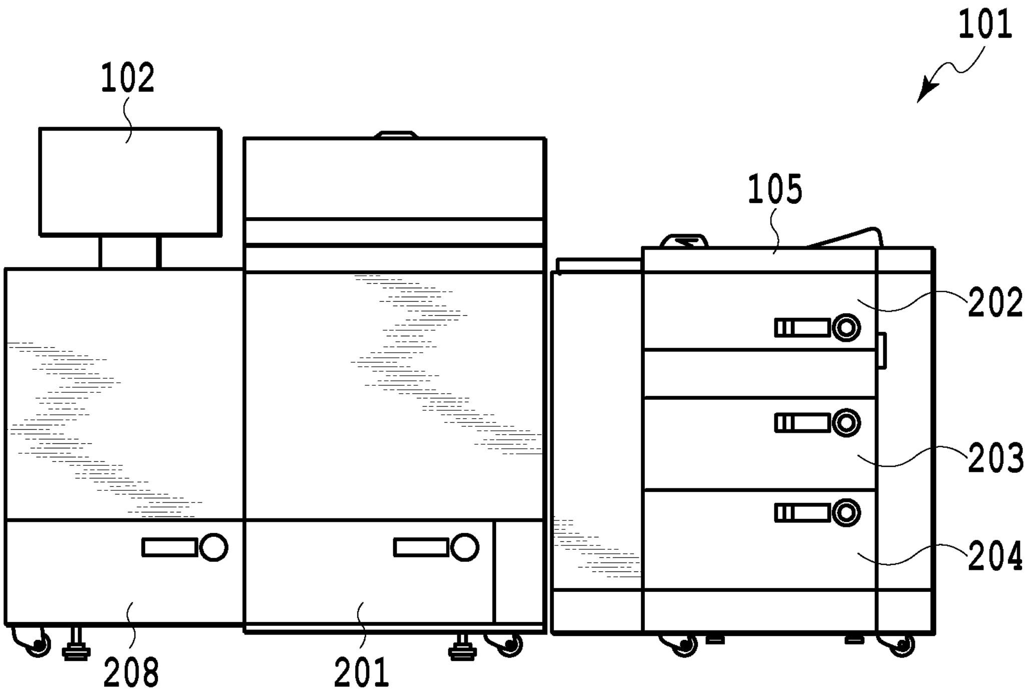
FIG. 1 is a partial schematic view of a printing apparatus of an embodiment.

FIG. 1 is a schematic view showing an example of a printing apparatus 101 of the present embodiment. The printing apparatus 101 is, for example, an electrophotographic printing apparatus. Further, a UI panel 102 is a user interface having a capacitive touch panel, for example. The printing apparatus 101 comprises paper feed trays 201 to 204 and 208.

Figure 2:
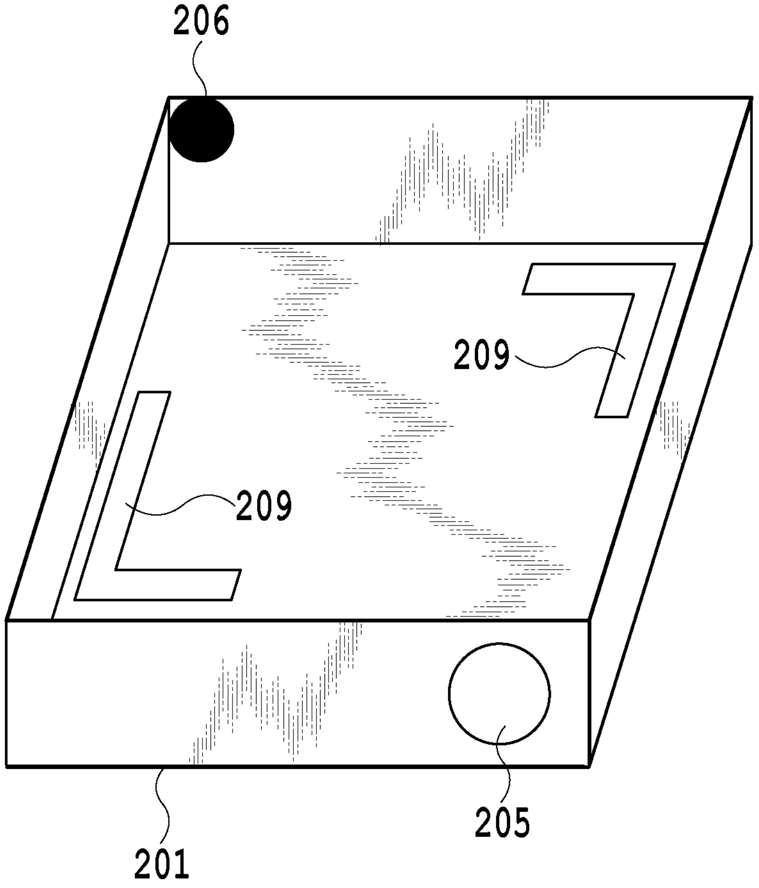
FIG. 2 is a schematic view of a paper feed tray of the embodiment.

FIG. 2 is a schematic view of a paper feed tray included in the printing apparatus 101. The paper feed tray 201 includes a paper feed tray opening button 205. Further, the paper feed tray opening button 205 has the function of detecting a button pressing method (a single click, a double click, or a long press of a button) at the time of opening the paper feed tray. Further, the paper feed tray 201 includes a remaining-number-of-sheets detection sensor 206 for detecting the presence or absence of paper stacked in the paper feed tray 201 and the remaining number of sheets of paper. Furthermore, the paper feed tray 201 includes a paper size detection sensor 209 for detecting the size of paper set in the paper feed tray 201. Still further, each paper feed tray includes an opening/closing detection sensor (not shown) for detecting the opening and closing of the paper feed tray.

Figure 3:
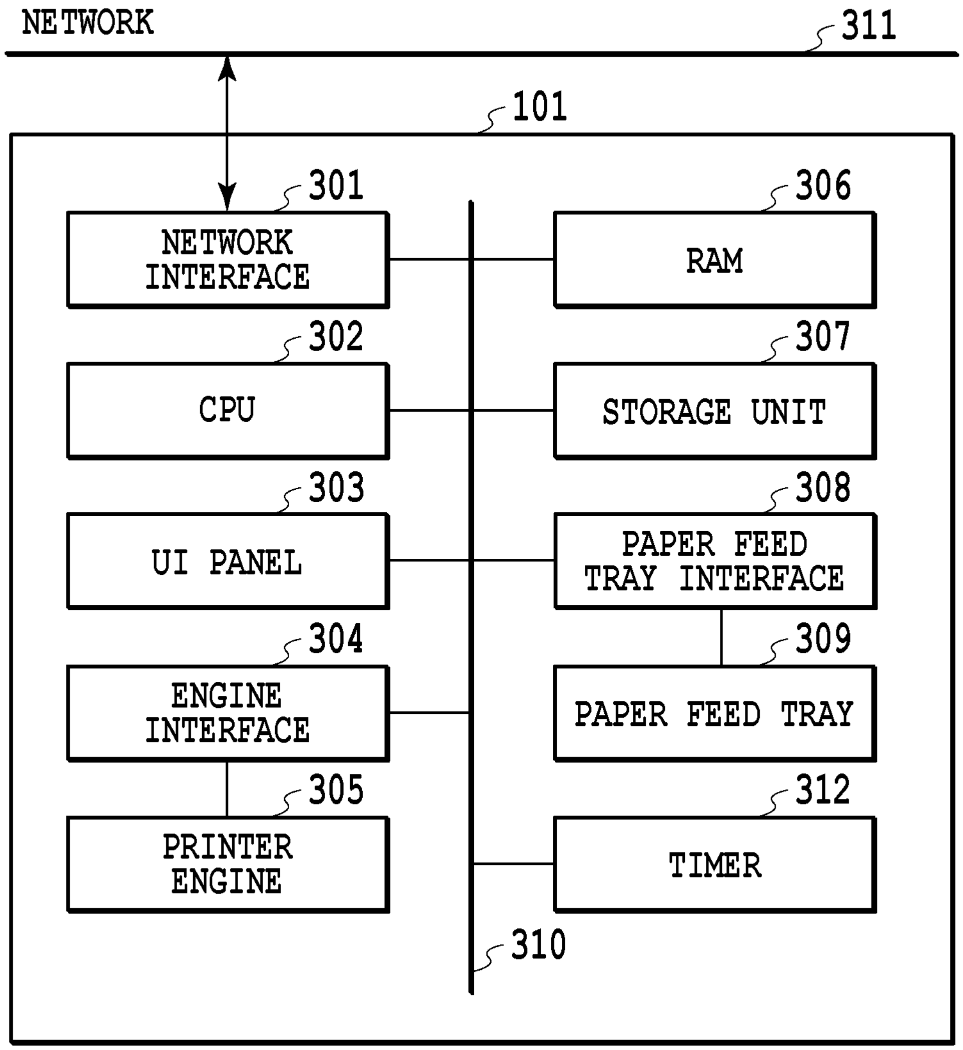
FIG. 3 is a block diagram showing the hardware module configuration of the printing apparatus of the embodiment.

FIG. 3 is a block diagram showing an example of the hardware configuration of the printing apparatus 101 of the present embodiment. A network interface 301 communicates with another apparatus such as a host computer via a network 311. A central processing unit (CPU) 302 performs control and operation for each unit in the printing apparatus 101 via a system bus 310. Further, the CPU 302 executes a program stored in a storage unit 307 and loaded into a random access memory (RAM) 306. The RAM 306 is a type of common volatile storage device which can be directly accessed by the CPU 302, and is used as a work area or another temporary data storage region which is used by the CPU 302. The storage unit 307 functions as a temporary storage region and a work memory at the time of operation of the printing apparatus. An engine interface 304 communicates with a printer engine 305 and controls the printer engine 305. A paper feed tray interface 308 communicates with a paper feed tray 309 and controls the paper feed tray 309. The term "paper feed tray 309" collectively refers to the paper feed trays 201 to 204 and 208 as hardware configurations. A timer 312 is used to measure a time during which the paper feed tray opening button 205 is pressed and a time during which the paper feed tray is opened. A UI panel 303 is a hardware configuration of the UI panel 102 and is a user interface for performing all the operations of the printing apparatus 101. In the present embodiment, the UI panel 303 includes a capacitive touch panel.

Figure 4:
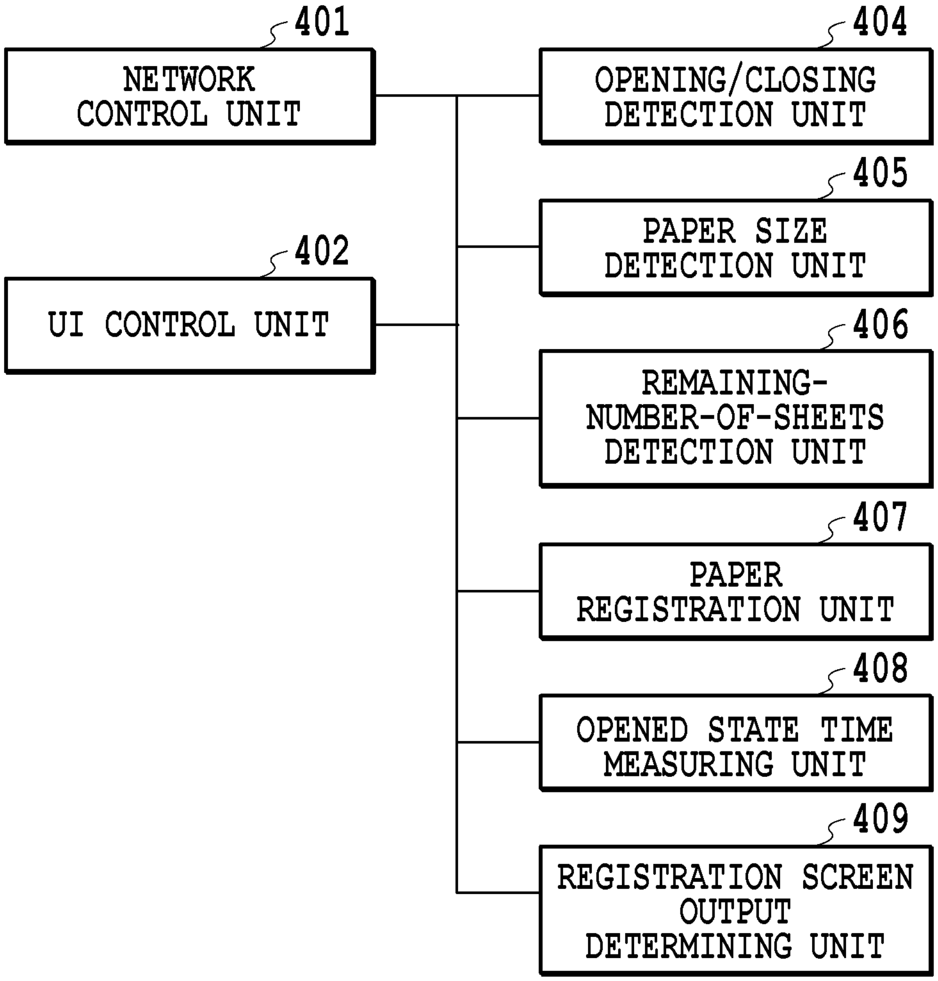
FIG. 4 is a block diagram showing the software module configuration of the printing apparatus of the embodiment.

FIG. 4 is a block diagram showing an example of the software module configuration of the printing apparatus 101 of the present embodiment. Each software module as a program is stored in the storage unit 307 of the printing apparatus 101 and read into the RAM 306 as necessary and controlled and executed by the CPU 302.

A network control unit 401 is executed by the CPU 302 and communicates with another apparatus such as a host computer via the network 311. A UI control unit 402 is executed by the CPU 302 and instructs the UI panel 303 to change content to be displayed. An opening/closing detection unit 404 is executed by the CPU 302 to detect via the sensor included in the paper feed tray 309 that a user opens or closes any paper feed tray belonging to the paper feed tray 309. The opening and closing of the paper feed tray encompasses the opening of the paper feed tray and the closing of the paper feed tray. More specifically, the opening/closing detection unit 404 detects that the paper feed tray is opened and that the paper feed tray is closed. Further, the opening/closing detection unit 404 obtains a button pressing method at the time of opening the paper feed tray via the paper feed tray opening button 205 included in the paper feed tray 309. The obtained number of the paper feed tray and the obtained button pressing method at the time of opening the paper feed tray are transmitted to and stored in the storage unit 307 by the opening/closing detection unit 404.

A paper size detection unit 405 is executed by the CPU 302 and in a case where the opening/closing detection unit 404 detects that the paper feed tray is opened, the paper size detection unit 405 detects and obtains, via the sensor 209, information on a paper size before the paper feed tray is opened. The paper size detection unit 405 stores the obtained information on a paper size as a paper size before the paper feed tray is opened in the storage unit 307. Further, in a case where the opening/closing detection unit 404 detects that the paper feed tray is closed, the paper size detection unit 405 detects and obtains, via the sensor 209, the information on the size of paper set in the paper feed tray. The paper size detection unit 405 stores the obtained information on a paper size as a paper size after the paper feed tray is closed in the storage unit 307.

A remaining-number-of-sheets detection unit 406 is executed by the CPU 302, and in a case where the opening/closing detection unit 404 detects that the paper feed tray is opened, the remaining-number-of-sheets detection unit 406 detects and obtains the remaining number of sheets of paper before the paper feed tray is opened via the sensor 206. The remaining-number-of-sheets detection unit 406 stores, in the storage unit 307, the obtained remaining number of sheets of paper as the remaining number of sheets of paper before the paper feed tray is opened. Further, in a case where the opening/closing detection unit 404 detects that the paper feed tray is closed, the remaining-number-of-sheets detection unit 406 detects and obtains information on the remaining number of sheets of paper set in the paper feed tray via the sensor 206. The remaining-number-of-sheets detection unit 406 stores, in the storage unit 307, the obtained information on the remaining number of sheets of paper as the remaining number of sheets of paper after the paper feed tray is closed.

A paper registration unit 407 is executed by the CPU 302. The paper registration unit 407 sets a paper type whose registration is received with the UI panel 303 for the paper feed tray detected by the opening/closing detection unit 404. The paper registration unit 407 stores the set paper type in the storage unit 307. In a case where the printer engine 305 performs printing processing, the CPU 302 obtains a paper type set for the used paper feed tray from the storage unit 307 and changes control of the printer engine 305 accordingly. The control of the printer engine 305 is changed according to the basis weight and surface properties of paper used for printing, whereby printing is realized with appropriate output image quality. The control of the printer engine 305 changed according to the paper type is, for example, the setting of a paper conveyance speed or the temperature of a fixing unit (not shown).

An opened state time measuring unit 408 is executed by the CPU 302 and in a case where the opening/closing detection unit 404 detects that the paper feed tray is opened, the opened state time measuring unit 408 instructs the timer 312 to start measurement. In a case where the opening/closing detection unit 404 detects that the paper feed tray is closed, the opened state time measuring unit 408 instructs the timer 312 to end measurement. A time from the start of measurement to the end of measurement is stored in the storage unit 307 by the opened state time measuring unit 408.

A registration screen output determining unit 409 is executed by the CPU 302 and accesses the storage unit 307, obtains paper size information and the remaining number of sheets of paper before the paper feed tray is opened and paper size information and the remaining number of sheets of paper after the paper feed tray is closed, and calculates their changes. Further, the registration screen output determining unit 409 accesses the storage unit 307, refers to a registration screen output determining table which will be described later, and determines whether to output the paper type registration screen to the UI panel 303.

In the above description, explanation has been made by taking, as an example, a case where if the opening/closing detection unit 404 detects that the paper feed tray is opened, the paper size detection unit 405 and the remaining-number-of-sheets detection unit 406 detect and obtain, via the sensor 209, the paper size and the remaining number of sheets of paper before the paper feed tray is opened. However, the paper size detection unit 405 and the remaining-number-of-sheets detection unit 406 may periodically detect the paper size and the remaining number of sheets of paper with the sensor 209. Alternatively, the paper size detection unit 405 and the remaining-number-of-sheets detection unit 406 may detect only a change of paper size and the remaining number of sheets of paper. Further, in a case where the opening/closing detection unit 404 detects that the paper feed tray is opened, the paper size detection unit 405 and the remaining-number-of-sheets detection unit 406 may obtain the already detected paper size and remaining number of sheets of paper.

Figure 5:
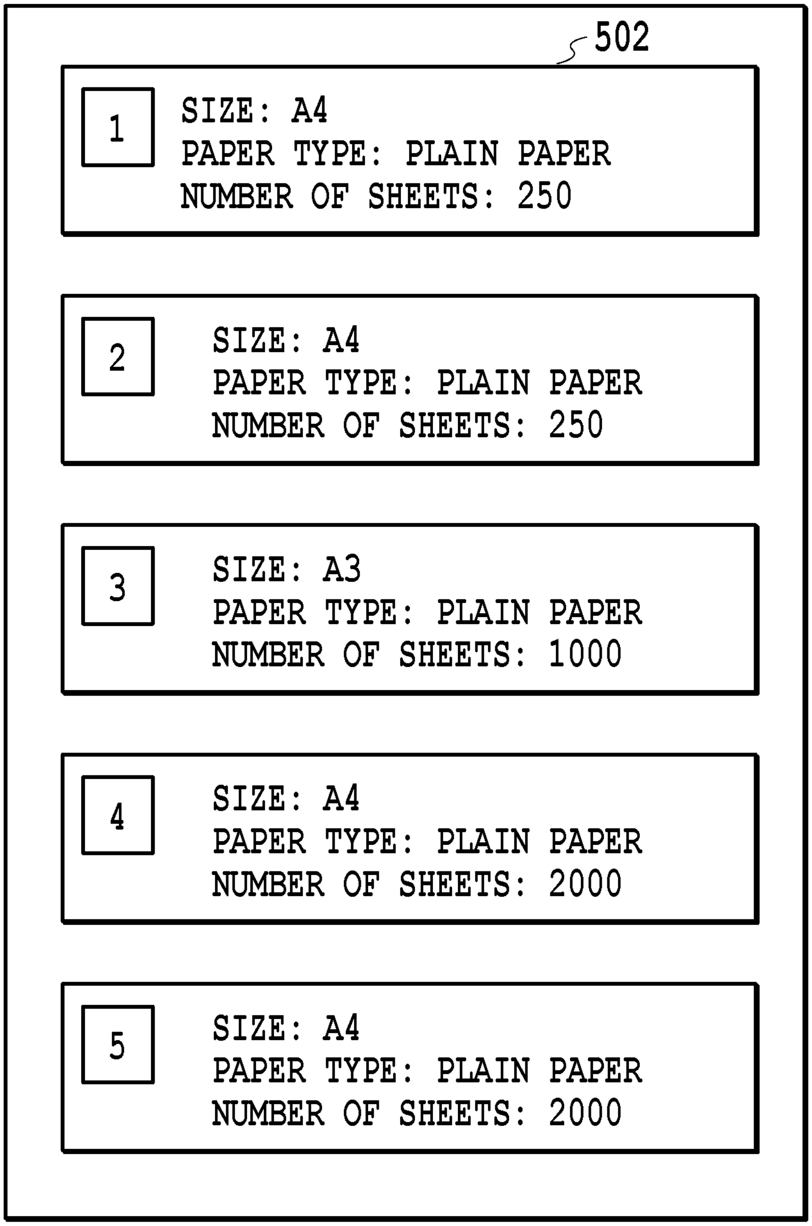
FIG. 5 is a view showing examples of the states of the paper feed trays of the embodiment.

FIG. 5 is a view showing the sizes, types, and remaining numbers of sheets of paper in the paper feed trays 201 to 204 and 208 included in the printing apparatus 101 of the present embodiment. In a state 502, for example, "250" sheets of "A4-size" "plain paper" are set in a paper feed tray 1. This information is stored in the storage unit 307. For example, in a case where the user opens and closes the paper feed tray 1, the CPU 302 instructs the opening/closing detection unit 404 to receive the number of the paper feed tray 1 which is opened and closed. Further, the CPU 302 instructs the paper size detection unit 405 to obtain information on the size of paper in the paper feed tray 1 which is opened and closed and to update the information on the size of paper in the paper feed tray 1. Further, the CPU 302 instructs the remaining-number-of-sheets detection unit 406 to obtain the information on the remaining number of sheets of paper in the paper feed tray 1 which is opened and closed and to update the remaining number of sheets in the paper feed tray 1. Further, in a case where the user gives a paper registration instruction, the CPU 302 instructs the paper registration unit 407 to obtain the type of paper in the paper feed tray 1 which is opened and closed and to update the type of paper in the paper feed tray 1.

<Regarding Creation of Registration Screen Output Determining Table>

FIG. 6 is a table storing an output condition for determining whether or not to output, to the UI panel 303, a paper type registration screen for a paper feed tray which is opened and closed in a case where the user opens and closes the paper feed tray. This table is stored in the storage unit 307, and values in the table are updated based on an instruction to set output of a paper registration screen from the user. Further, paper feed tray numbers 1 to 5 are allocated to the paper feed trays 201, 208, 202, 203, and 204 included in the printing apparatus 101, respectively. In FIG. 6, items of default screen output, an exception (the remaining number of sheets), an exception (a condition for the remaining number of sheets), and an exception (a paper size) are set for each paper feed tray. The details of each item will be described later. By using the determining table shown in FIG. 6, the user can freely set whether or not to output a paper type registration screen in what state of a paper feed tray. A method for setting the table will be described below.

Figure 7:
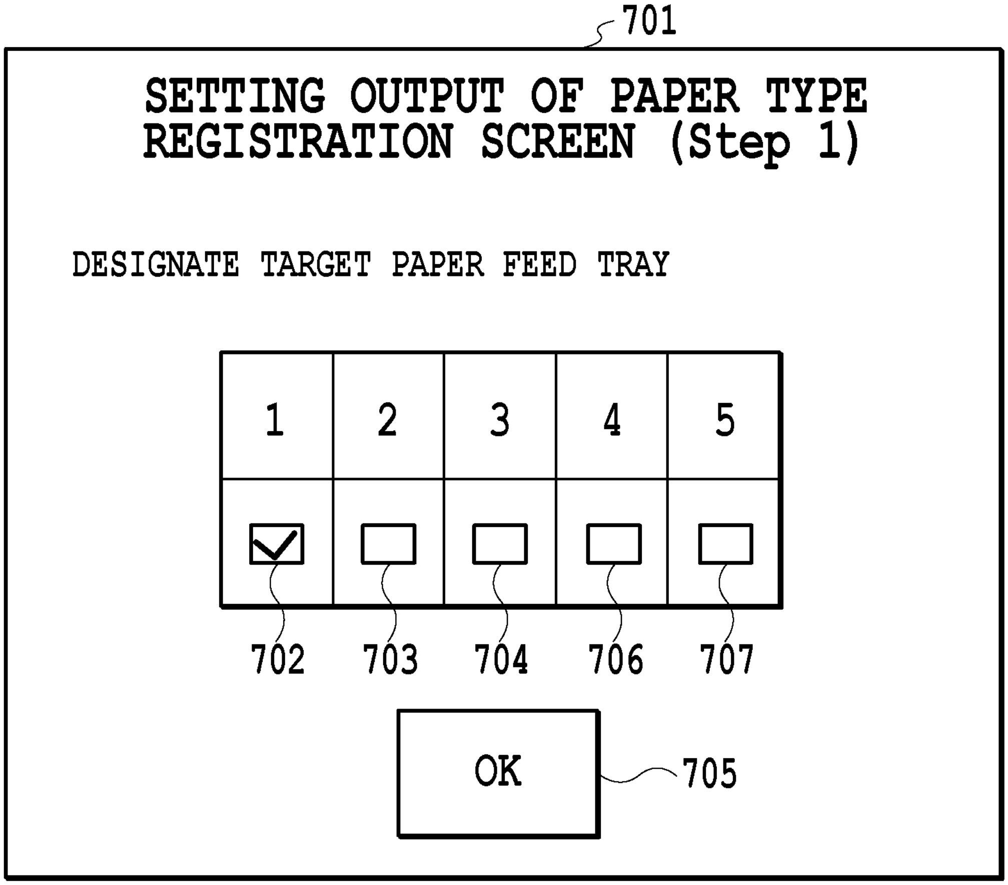
FIG. 7 is a view showing a UI for setting output of the paper type registration screen of the embodiment.

FIG. 7 shows a screen for setting, based on the user's instruction, whether or not it is necessary to output a paper type registration screen for which paper feed tray. A screen 701 is stored in the storage unit 307, and in a case where the user instructs the screen 701 to display through the UI panel 303, the CPU 302 obtains the screen 701 from the storage unit 307. Further, the CPU 302 instructs the UI control unit 402 to cause the screen 701 to be displayed on the UI panel 303. The user operates the UI panel 303 to select a paper feed tray for which the display setting of a paper type registration screen is to be made. For example, in order to make the display setting of a paper type registration screen for the paper feed tray 1, it is necessary to select a check box 702 and press (touch) an OK button 705. Likewise, it is possible to select any of check boxes 703, 704, 706, and 707 for the other paper feed trays. After a paper feed tray for which the display setting of a paper type registration screen is to be made is selected, the user presses the OK button 705. After the OK button 705 is pressed, the CPU 302 stores, in the storage unit 307, a paper feed tray number specified by the user on the screen 701. Further, the CPU 302 instructs the UI control unit 402 to cause a screen 801 shown in FIG. 8 to be displayed on the UI panel 303.

Figure 8:
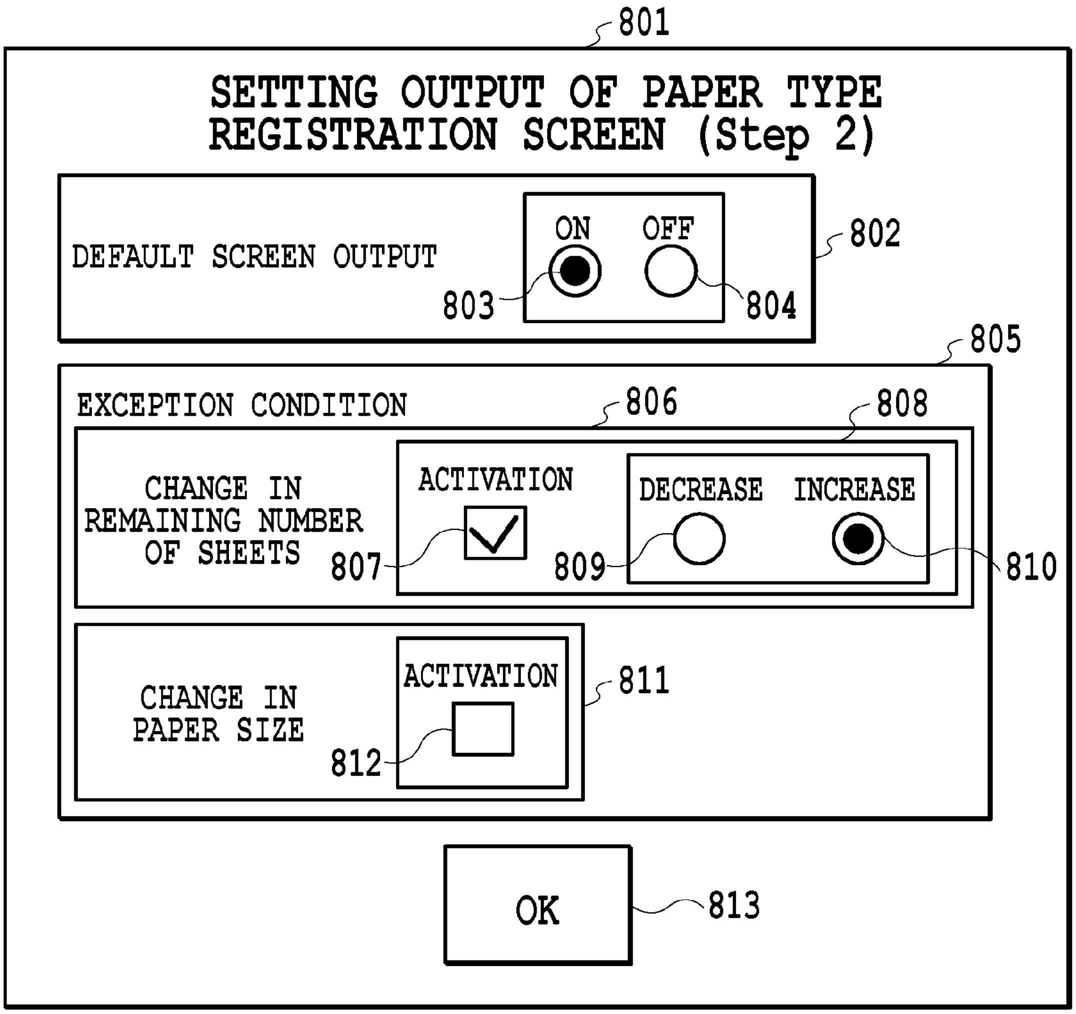
FIG. 8 is a view showing a UI for setting output of the paper type registration screen of the embodiment.

FIG. 8 shows the screen 801 for selecting a condition for outputting a paper type registration screen for the paper feed tray selected on the screen 701. Incidentally, in a case where the CPU 302 obtains data from the storage unit 307 to instruct the UI control unit 402, the screen 801 is displayed on the UI panel 303. An item 802 is an item for selecting whether or not to display a default paper type registration screen on the UI panel 303 in a case where the paper feed tray selected through the screen 701 is opened and closed. Incidentally, in a case where whether or not to display the default paper type registration screen is selected in the item 802, its exception condition can be set in an item 805 which will be described later. More specifically, in a case where the item 802 relating to output of the default screen is set to be "ON," if the paper feed tray is opened and closed, the paper type registration screen is basically output. However, in a case where the exception condition set in the item 805 is satisfied, the registration screen is not output. Further, in a case where the item 802 relating to output of the default screen is set to be "OFF," if the paper feed tray is opened and closed, the paper type registration screen is not basically output. However, in a case where the exception condition set in the item 805 is satisfied, the registration screen is output.

In a case where the user selects an "ON" button 803 in an item 802 and presses an OK button 813, the CPU 302 accesses a registration screen output determining table 601, and sets the item of default screen output for the paper feed number selected through the screen 701 to be "ON." The other items will be described below by taking, as an example, a case where the item of the default screen output is "ON."

The item 805 is an item for setting the exception condition for content selected in the item 802. An item 808 is an item for setting the exception condition relating to a change in the remaining number of sheets of paper. For example, the user selects an "activation" box 807, selects an "increase" button 810, and presses an OK button 813. Then the CPU 302 accesses the registration screen output determining table 601, and sets the item of the exception (the remaining number of sheets) for the paper feed tray number selected on the screen 701 to be "active." Further, the exception condition (the remaining number of sheets) is set to be "an increase." This selection means that in a case where the paper feed tray selected on the screen 701 is opened and closed, the paper type registration screen is output to the UI panel 303, but that in a case where there is an increase in the remaining number of sheets of paper before and after the paper feed tray is opened and closed, the paper type registration screen is not output to the UI panel 303. Further, an item 811 is an item for setting the exception condition relating to a change in paper size. For example, in a case where the user selects an "activation" box 812 and presses the OK button 813, the CPU 302 accesses the registration screen output determining table 601 and sets the item of the exception (paper size) for the paper feed tray number selected on the screen 701 to be "active." This selection means that in a case where the paper feed tray selected on the screen 701 is opened and closed, the paper type registration screen is output to the UI panel 303, but that in a case where there is a change in paper size before and after the paper feed tray is opened and closed, the paper type registration screen is not output to the UI panel 303. In this manner, it is possible not only to determine whether or not to output the paper type registration screen in a case where the paper feed tray is opened and closed, but also to output the paper type registration screen to the UI panel 303 in a case where there is a change in the remaining number of sheets or a change in paper size before and after the paper feed tray is opened and closed.

Incidentally, explanation has been made with reference to FIG. 8 by taking, as an example, a setting screen for one paper feed tray. However, in a case where a plurality of paper feed trays are specified on the screen 701, the screen 801 of FIG. 8 can be set for each paper feed tray. Otherwise, setting for the plurality of paper feed trays may be collectively made on the screen 801 of FIG. 8.

<Explanation of a Flowchart for Determining Whether or not it is Necessary to Output a Paper Type Registration Screen (Case 1)>

Next, processing for determining whether or not it is necessary to output a paper type registration screen will be described for each use case with reference to the flowchart. As a case 1, there is cited a use case in which a paper type registration screen is output by default, but in which if there is an increase in the remaining number of sheets of paper before and after a paper feed tray is opened and closed, it is determined that paper is added, and the paper type registration screen is not output.

FIGS. 9A to 10B are flowcharts showing an example of a process flow for the printing apparatus 101 of the present embodiment. A control program for this flow is stored in the storage unit 307, and the CPU 302 reads the control program into the RAM 306. Further, this flowchart will be explained assuming that the paper feed trays are in the states shown in FIG. 5 and that the paper type registration screen output determining table is the one shown in FIG. 6.

In step S901, the opening/closing detection unit 404 detects that the user opens and closes the paper feed tray. In the case 1, the user opens the paper feed tray 1, adds 300 sheets of "A4-size" paper, and closes the paper feed tray. In a case where it is detected in step S901 that the paper feed tray is closed, the process proceeds to step S902. In a case where it is not detected that the paper feed tray is closed, the process returns to the beginning of the flow, and it is checked again whether the paper feed tray is opened and closed.

In step S902, the remaining-number-of-sheets detection unit 406 obtains, from the storage unit 307, the remaining number of sheets of paper after the paper feed tray 1 is closed. In a case where the detected remaining number of sheets is "0," the process ends. The details of this process will be described later. In the case 1, in step S902, the remaining number of sheets of paper after the paper feed tray 1 is closed is obtained from the storage unit 307, and it is detected that the remaining number of sheets of paper is "550." In this case, the detected remaining number of sheets of paper is not "0," and the process proceeds to step S903.

In step S903, the opened state time measuring unit 408 detects a time during which the paper feed tray is opened. In a case where the detected time during which the paper feed tray is opened is shorter than a preset time, the process ends. The details of this process will be described later. In the case 1, it is determined that the time during which the paper feed tray is opened is not shorter than the preset time. In this case, the process proceeds to step S904.

In step S904, the opening/closing detection unit 404 detects a button pressing method at the time of opening the paper feed tray as detected. The opening/closing detection unit 404 instructs the registration screen output determining unit 409 to confirm whether the button pressing method at the time of opening the paper feed tray is a paper feed tray button pressing pattern for outputting the paper type registration screen. The details will be described later. This time, it is determined that the button pressing method at the time of opening the paper feed tray is not the button pressing pattern for outputting the paper type registration screen. In this case, the process proceeds to step S905.

Figure 10B:
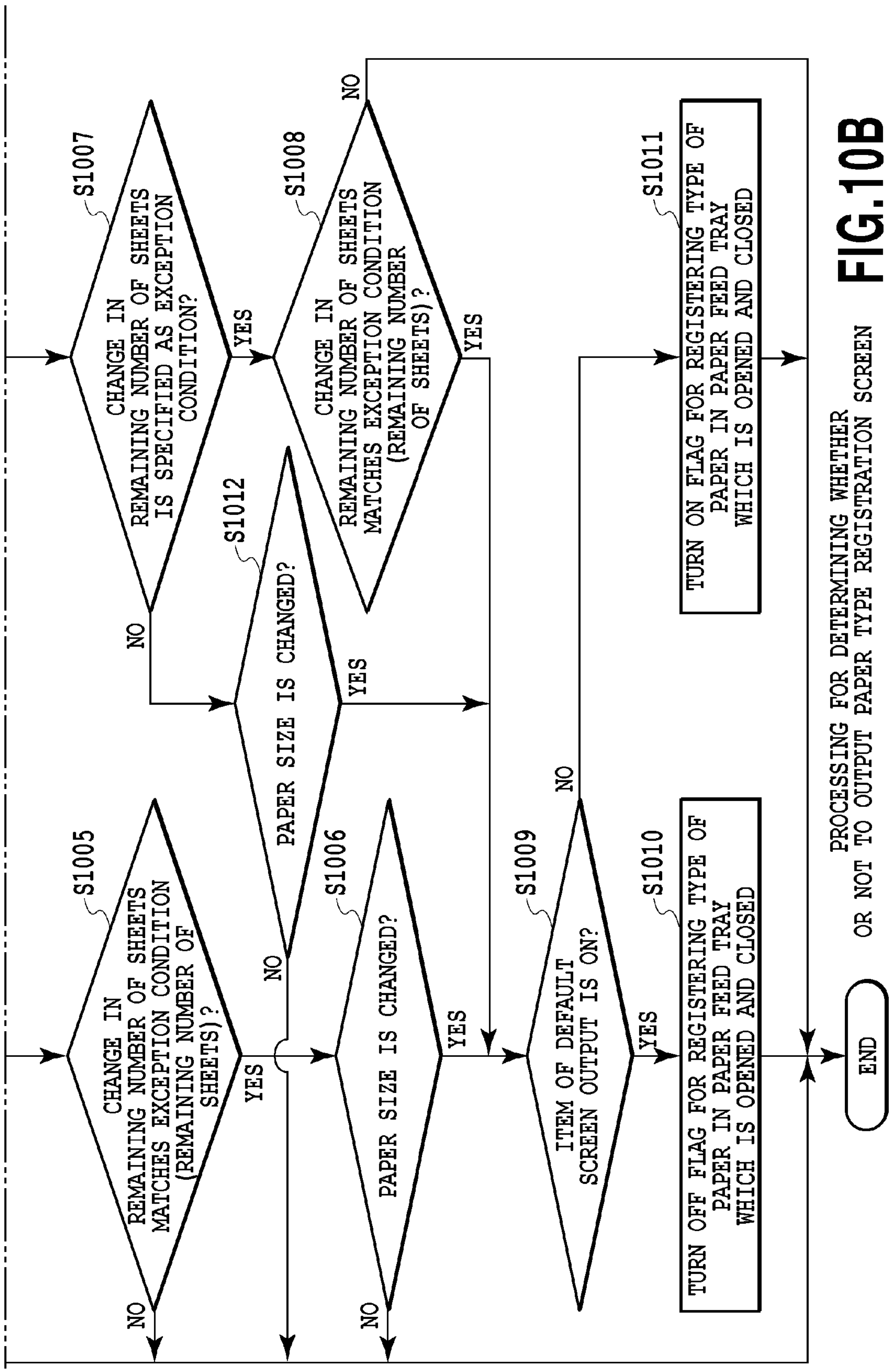

In step S905, the registration screen output determining unit 409 determines output of the paper type registration screen. FIGS. 10A and 10B show the details of step S905. Explanation will be made below with reference to FIGS. 10A and 10B.

In step S1001, the registration screen output determining unit 409 accesses the registration screen output determining table 601, and confirms the item of the default screen output for the paper feed tray 1 which is opened and closed. The item of the default screen output for the paper feed tray 1 is "ON," and the process proceeds to step S1002. In step S1002, the registration screen output determining unit 409 accesses the storage unit 307 and turns on a flag for registering the type of paper in the paper feed tray 1 which is opened and closed. Then the process proceeds to step S1003. This flag is used in step S906 of FIG. 9B which will be described later to finally determine whether or not to output the paper type registration screen.

In step S1003, the registration screen output determining unit 409 accesses the registration screen output determining table 601, confirms the exception condition for the paper feed tray 1, and confirms whether at least one of the item of the exception (the remaining number of sheets) and the item of the exception (paper size) is "active." In the case 1, the item of the exception (the remaining number of sheets) for the paper feed tray 1 is "active," and the process proceeds to step S1004.

In step S1004, the registration screen output determining unit 409 accesses the registration screen output determining table 601 and confirms whether both of the items of the exception (the remaining number of sheets) and the exception (paper size) for the paper feed tray 1 are "active." In the case 1, only the item of the exception (the remaining number of sheets) for the paper feed tray 1 is "active," and the process proceeds to step S1007.

In step S1007, the registration screen output determining unit 409 accesses the registration screen output determining table 601 and confirms whether the item of the exception (the remaining number of sheets) for the paper feed tray 1 is "active." This time, the item of the exception (the remaining number of sheets) for the paper feed tray 1 is "active," and the process proceeds to step S1008. In step S1008, the registration screen output determining unit 409 accesses the registration screen output determining table 601, and obtains the condition for the exception (the remaining number of sheets) for the paper feed tray which is opened and closed. Further, the registration screen output determining unit 409 accesses the storage unit 307 and obtains the number of sheets of paper in the paper feed tray before the paper feed tray is opened. Further, the registration screen output determining unit 409 accesses the storage unit 307 and obtains the number of sheets of paper in the paper feed tray after the paper feed tray is closed. Whether the number of sheets of paper increases or decreases is determined by comparing the number of sheets of paper after the paper feed tray is closed with the number of sheets of paper before the paper feed tray is opened. In the case 1, the exception condition (the remaining number of sheets) for the paper feed tray 1 which is opened and closed is "an increase." Further, the number of sheets of paper after the paper feed tray 1 is closed is "550," and the number of sheets of paper before the paper feed tray 1 is opened is "250." Accordingly, the registration screen output determining unit 409 determines that the number of sheets of paper "increases" by 300 before and after the paper feed tray is opened and closed. This matches the exception condition (the remaining number of sheets) for the paper feed tray 1 which is opened and closed, and the process proceeds to step S1009.

In step S1009, the registration screen output determining unit 409 accesses the registration screen output determining table 601, and confirms the item of the default screen output for the paper feed tray 1 which is opened and closed. The item of the default screen output for the paper feed tray 1 is "ON," and the process proceeds to step S1010. In step S1010, the registration screen output determining unit 409 accesses the storage unit 307, and turns off a flag for registering the type of paper in the paper feed tray 1 which is opened and closed. More specifically, in the case 1, although the item of the default screen output is "ON," the exception condition is satisfied, and accordingly, the flag is turned off in order not to output the paper type registration screen. Then the process of FIGS. 10A and 10B end and the process proceeds to step S906 of FIG. 9B.

In step S906, the registration screen output determining unit 409 accesses the storage unit 307, and confirms whether the flag for registering the type of paper in the paper feed tray 1 which is opened and closed is on. This time, the flag for registering the type of paper in the paper feed tray 1 which is opened and closed is off, and the process ends.

<Explanation of a Flowchart for Determining Whether or not it is Necessary to Output a Paper Type Registration Screen (Case 2)>

Next, explanation will be made with reference to FIGS. 9A to 10B by taking, as an example, a use case where the paper type registration screen is not output by default, but if a paper size changes before and after the paper feed tray is opened and closed, the paper type registration screen is output. Further, the paper feed trays are in the states shown in FIG. 5, and the registration screen output determining table is the one shown in FIG. 6.

The user opens the paper feed tray 2, removes 250 sheets of "A4-size" paper which are already set, sets 300 sheets of "A3-size" paper, and closes the paper feed tray. Then in step S901, the opening/closing detection unit 404 detects that the user opens and closes the paper feed tray. In a case where it is detected in step S901 that the paper feed tray is closed, the process proceeds to step S902. Then the process proceeds to steps S901, S902, S903, S904, S905, and S1001. However, their details are the same as the ones in the case 1 which have been described above, and explanation thereof is omitted.

In step S1001, the registration screen output determining unit 409 accesses the registration screen output determining table 601, and confirms the item of the default screen output for the paper feed tray 2 which is opened and closed. The item of the default screen output for the paper feed tray 2 is "OFF," and the process proceeds to step S1003. In step S1003, the registration screen output determining unit 409 accesses the registration screen output determining table 601 and confirms whether at least one of the items of the exception (the remaining number of sheets) and the exception (paper size) for the paper feed tray 2 is "active." In the case 2, the item of the exception (paper size) for the paper feed tray 2 is "active," and the process proceeds to step S1004. In step S1004, the registration screen output determining unit 409 accesses the registration screen output determining table 601, and confirms whether both of the items of the exception (the remaining number of sheets) and the exception (paper size) for the paper feed tray 2 are "active." In the case 2, only the item of the exception (size) for the paper feed tray 2 is "active," and the process proceeds to step S1007. In step S1007, the registration screen output determining unit 409 accesses the registration screen output determining table 601, and confirms whether the item of the exception (the remaining number of sheets) for the paper feed tray 2 is "active." In the case 2, the item of the exception (the remaining number of sheets) for the paper feed tray 2 is not "active," and the process proceeds to step S1012.

In step S1012, the registration screen output determining unit 409 obtains, from the storage unit 307, a paper size before the paper feed tray 2 is opened and a paper size after the paper feed tray is closed. Then both paper sizes are compared. In a case where as a result of comparison, it is determined that there is no difference in paper size, it is determined that a paper size does not change before and after the paper feed tray is opened and closed, and the process ends. In the case 2, the paper size before the paper feed tray is opened is "A4," and the paper size after the paper feed tray is closed is "A3." In this case, the registration screen output determining unit 409 compares both sizes and determines that the paper size changes, and the process proceeds to step S1009. In step S1009, the registration screen output determining unit 409 accesses the registration screen output determining table 601 and confirms the item of the default screen output for the paper feed tray 2 which is opened and closed. The item of the default screen output for the paper feed tray 2 is "OFF," and the process proceeds to step S1011. In step S1011, the registration screen output determining unit 409 accesses the storage unit 307 and turns on a flag for registering the type of paper in the paper feed tray 2 which is opened and closed. Then the process of FIGS. 10A and 10B end, and the process proceeds to step S906 of FIG. 9B.

In step S906, the registration screen output determining unit 409 accesses the storage unit 307, and confirms whether the flag for registering the type of paper in the paper feed tray 2 which is opened and closed is on. This time the flag for registering the type of paper in the paper feed tray 2 which is opened and closed is on, and the process proceeds to step S907. In step S907, the registration screen output determining unit 409 instructs the UI control unit 402 to output the paper type registration screen to the UI panel 303. Then the process proceeds to step S908. In step S908, the registration screen output determining unit 409 accesses the storage unit 307 and turns off the flag for registering the type of paper in the paper feed tray 2 which is opened and closed, and the process ends.

As stated above, in the case 2, the item of the default screen output is set so that the registration screen is not output. However, in a case where the paper size changes as the exception condition, the registration screen can be output.

<Explanation of a Flowchart for Determining Whether or not it is Necessary to Output a Paper Type Registration Screen (Case 3)>

Next, explanation will be made on a use case where the paper type registration screen is not output by default, but if a paper size changes before and after the paper feed tray is opened and closed and the remaining number of sheets of paper decreases, the paper type registration screen is output. Also in the case 3, the paper feed trays are in the states shown in FIG. 5 and the registration screen output determining table is the one shown in FIG. 6.

The user opens the paper feed tray 3, retrieves 1000 sheets of "A3-size" paper which are already set, sets 300 sheets of "A4-size" paper, and closes the paper feed tray. The opening/closing detection unit 404 detects in step S901 that the user opens and closes the paper feed tray. In a case where it is detected in step S901 that the paper feed tray is closed, the process proceeds to step S902. Then the process proceeds to steps S901, S902, S903, S904, S905, and S1001. Their details have been explained above for the case 1, and explanation thereof is omitted.

In step S1001, the registration screen output determining unit 409 accesses the registration screen output determining table 601, and confirms the item of the default screen output for the paper feed tray 3 which is opened and closed. The item of the default screen output for the paper feed tray 3 is "OFF," and the process proceeds to step S1003. In step S1003, the registration screen output determining unit 409 accesses the registration screen output determining table 601, and confirms whether at least one of the items of the exception (the remaining number of sheets) and the exception (paper size) for the paper feed tray 3 is "active." This time, both of the items of the exception (the remaining number of sheets) and the exception (paper size) for the paper feed tray 3 are "active," and the process proceeds to step S1004. In step S1004, the registration screen output determining unit 409 accesses the registration screen output determining table 601 and confirms whether both of the items of the exception (the remaining number of sheets) and the exception (paper size) for the paper feed tray 3 are "active." This time, both of the items of the exception (the remaining number of sheets) and the exception (size) are "active," and the process proceeds to step S1005.

In step S1005, the registration screen output determining unit 409 accesses the registration screen output determining table 601, and obtains the exception condition (the remaining number of sheets) for the paper feed tray 3 which is opened and closed. Further, the registration screen output determining unit 409 accesses the storage unit 307 and obtains the number of sheets of paper before the paper feed tray 3 is opened and the number of sheets of paper after the paper feed tray 3 is closed. Then it is determined whether the number of sheets of paper increases or decreases. In the case 3, the exception condition (the remaining number of sheets) for the paper feed tray 3 which is opened and closed is "a decrease." Further, the number of sheets of paper after the paper feed tray 3 is closed is "300," and the number of sheets of paper before the paper feed tray 3 is opened is "1000." The number of sheets of paper after the paper feed tray is closed is compared with the number of sheets of paper before the paper feed tray is opened to determine that the number of sheets of paper "decreases" by 700. This matches the exception condition (the remaining number of sheets) for the paper feed tray 3 which is opened and closed, and the registration screen output determining unit 409 causes the process to proceed to step S1006. In step S1006, the registration screen output determining unit 409 obtains, from the storage unit 307, the paper size before the paper feed tray 3 is opened. Further, the registration screen output determining unit 409 obtains, from the storage unit 307, the paper size after the paper feed tray 3 is closed. Then both paper sizes are compared. As a result of comparison, it is determined that in a case where there is no difference in paper size, the paper size does not change before and after the paper feed tray is opened and closed, and the process ends. This time, the paper size before the paper feed tray 3 is opened is "A3," and the paper size after the paper feed tray 3 is closed is "A4." In this case, since there is a difference between these two sizes, it is determined that the paper size changes, and the registration screen output determining unit 409 causes the process to proceed to step S1009. In step S1009, the registration screen output determining unit 409 accesses the registration screen output determining table 601 and confirms the item of the default screen output for the paper feed tray 3 which is opened and closed. The item of the default screen output for the paper feed tray 3 is "OFF," and the process proceeds to step S1011. Then the process proceeds to steps S1011, S906, S907, and S908. Their details have been described above for the case 2, and explanation thereof is omitted.

Incidentally, in the case 3, explanation has been made by taking, as an example, a case where if a plurality of the exception conditions are set, only on a condition that all the exception conditions are satisfied, the exception conditions apply. However, setting may be made so that in a case where a plurality of the exception conditions are set, if one of the exception conditions is satisfied, this exception condition applies. More specifically, steps S1004 to S1006 of FIGS. 10A and 10B may be deleted so that the process proceeds from step S1003 to step S1007.

<<Embodiment 2>>

In Embodiment 1 above, explanation has been made by taking, as an example, a case where the user sets the registration screen output determining table as shown in FIG. 6 beforehand and the registration screen is output according to the conditions. However, it is possible to presume a case where it can be determined from the state of the paper feed tray that paper replacement is not performed to change a paper type. Further, it is also possible to presume a use case that the user desires to consciously register a paper type. In Embodiment 2, explanation will be made on a case where it is determined whether or not the registration screen is to be output in association with the opening and closing of the paper feed tray.

More specifically, explanation will be made on a method for determining whether or not to output the paper type registration screen without depending on the setting of the registration screen output determining table for each paper feed tray as explained in Embodiment 1 with reference to FIG. 6. A printing apparatus of the present embodiment is the same as that of Embodiment 1.

Figure 11:
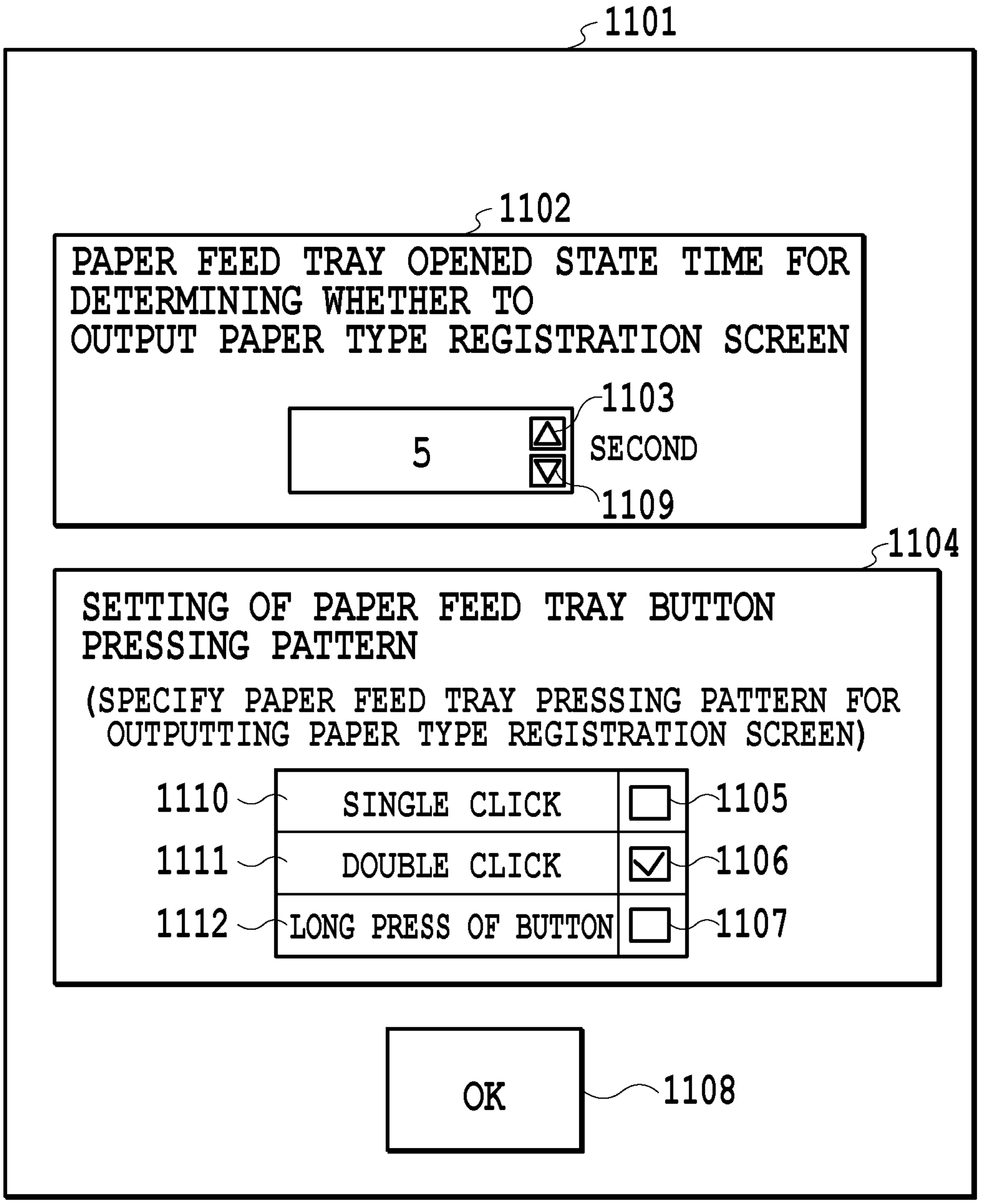
FIG. 11 is a view showing a UI for setting output of a paper type registration screen of an embodiment.

FIG. 11 shows a screen for setting an operation condition for determining whether or not to output the paper type registration screen without depending on the setting of the registration screen output determining table as shown in FIG. 6 for Embodiment 1. A screen 1101 is stored in the storage unit 307, and in a case where the user operates the UI panel 303 to give an instruction to display the screen 1101, the CPU 302 obtains the screen 1101 from the storage unit 307. Further, the CPU 302 instructs the UI control unit 402 to cause the screen 1101 to be displayed on the UI panel 303. The user operates the UI panel 303 to set the condition for determining whether or not to output the paper type registration screen without depending on the setting of the registration screen output determining table.

An item 1102 is an item for setting a maximum time from the user's opening the paper feed tray 309 to the user's closing the paper feed tray 309 such that the paper type registration is not displayed. The user operates the button 1103 and the button 1109 to designate the paper feed tray opening time for determining whether the paper registration screen is not to be displayed. In a case where an OK button 1108 is pressed after the time is designated, the CPU 302 stores the set value in the storage unit 307.

Further, an item 1104 is an item for setting a paper feed tray button pressing pattern. "A single click" 1110 means that in a case where the user single-clicks the paper feed tray opening button 205 to open the paper feed tray, the paper type registration screen is output without depending on the setting of the registration screen output determining table as shown in FIG. 6. Further, "a double click" 1111 means that in a case where the user double-clicks the paper feed tray opening button 205 to open the paper feed tray, the paper type registration screen is output without depending on the setting of the registration screen output determining table as shown in FIG. 6. Further, "a long press of a button" 1112 means that in a case where the user presses the paper feed tray opening button 205 for a longer time than usual to open the paper feed tray, the paper type registration screen is output without depending on the setting of the registration screen output determining table as shown in FIG. 6. How long the button needs to be pressed so that the press is determined to be "a long press" is set in the printing apparatus 101 beforehand. The time during which the user presses the button as measured by the timer 312 is compared with the set time to determine whether or not a button press for opening the paper feed tray is a long press.

The user operates boxes 1105, 1106, and 1107 to designate the paper feed tray opening button pressing pattern for outputting the paper type registration screen. In a case where the OK button 1108 is pressed after the setting, the CPU 302 stores the set value in the storage unit 307.

<Flow for Determining Whether to Output the Registration Screen which does not Depend on the Setting Condition in Embodiment 1 (Case A)>

Next, a flow for determining whether to output the registration screen which does not depend on the setting condition in Embodiment 1 will be described by taking, as an example, each use case. In a case A, explanation will be made on a use case where if the remaining number of sheets of paper is zero after the paper feed tray is closed, the paper type registration screen is not output.

Figures 9, 9A:
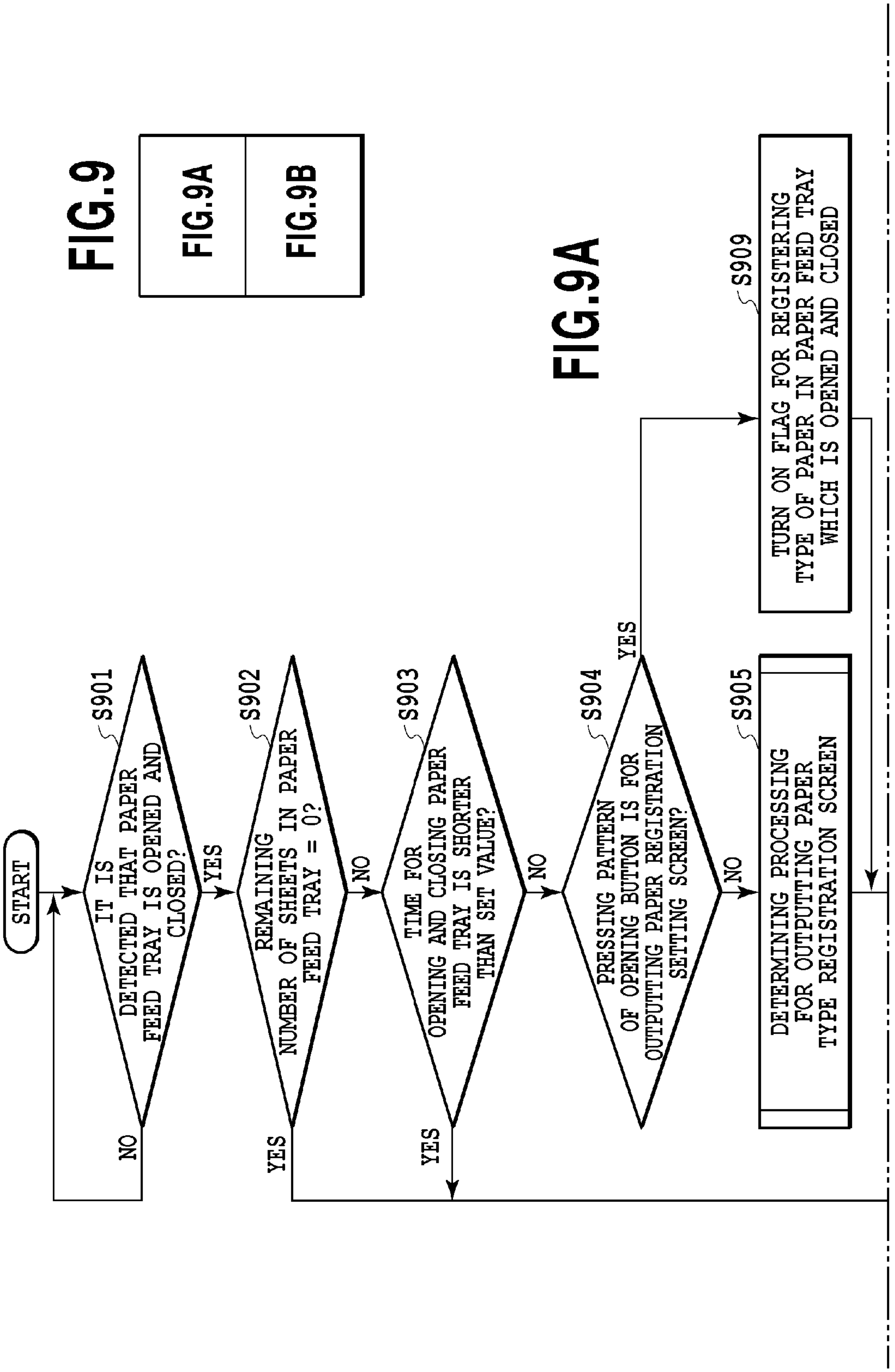
FIG. 9 is a diagram showing the relationship of FIGS. 9A and 9B.
FIGS. 9A and 9B totally show a flowchart showing processing for the printing apparatus of the embodiment.
Figure 9B:
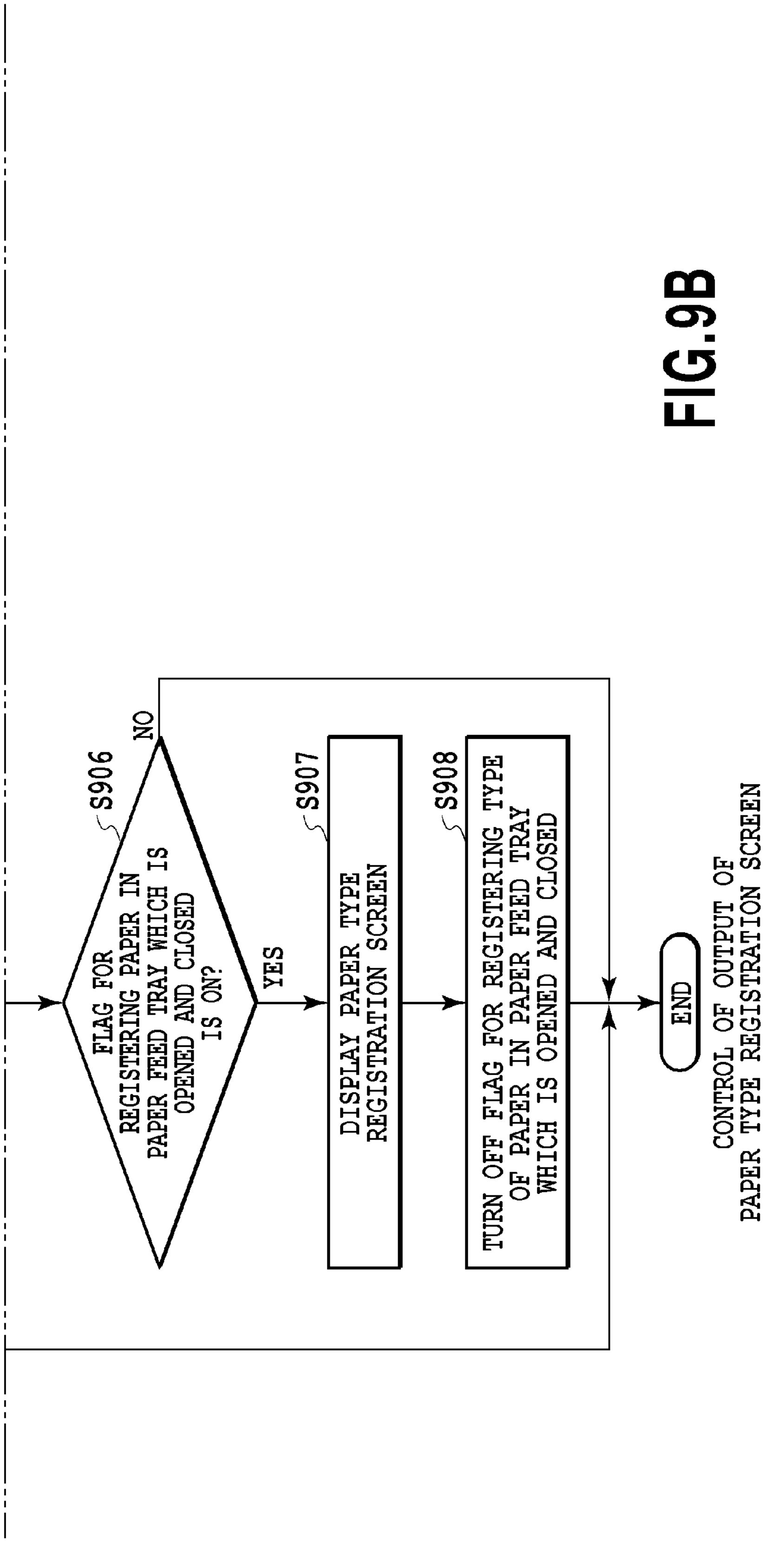

A process in the case A will be described by using FIGS. 9A and 9B which are referred to for explanation of Embodiment 1. The paper feed trays are in the states shown in FIG. 5 and the registration screen output determining table is the one shown in FIG. 6.

In a case where the user opens the paper feed tray 1, retrieves all "A4-sized" paper, and closes the paper feed tray, the opening/closing detection unit 404 detects in step S901 that the user opens and closes the paper feed tray. In a case where it is detected in step S901 that the paper feed tray is closed, the process proceeds to step S902. In step S902, the remaining-number-of-sheets detection unit 406 accesses the storage unit 307 and detects the remaining number of sheets of paper after the paper feed tray is closed. This time, the remaining number of sheets in the paper feed tray 1 which is opened and closed is "0." In a case where paper is not added, it is not necessary to display the paper registration screen on the UI panel 303. In this case, the CPU 302 ends the process. In this manner, in a case where it is clear from the opening/closing state of the paper feed tray that it is not necessary to change a paper type, control can be performed not to output an unnecessary paper type registration screen without referring to the registration screen output determining table.

<Flow for Determining Whether to Output the Registration Screen which does not Depend on the Setting Condition in Embodiment 1 (Case B)>

Next, explanation will be made on a use case where if a time for an operation from the paper feed tray being opened to closed is shorter than a predetermined value, the paper type registration screen is not output. In a case where a paper type is actually changed, all paper which is already set in the paper feed tray is retrieved and a new type of paper is set. It can also be thought that this takes time unlike mere supplementation of paper. In other words, in a case where a time for an operation for opening and closing the paper feed tray is shorter than a predetermined value, it can be estimated that the user only confirms the state of the paper feed tray, for example, and does not change a paper type. Accordingly, in a case B, explanation will be made on a case where a time during which the paper feed tray is opened is detected, and it is determined whether or not the registration screen is to be output. Incidentally, the user makes the setting shown in FIG. 11. More specifically, a paper feed tray opening time for determining whether the paper registration screen is not to be displayed is stored in the storage unit 307 and set to be "5" seconds.

In a case where the user opens the paper feed tray 1 and, after "1" second, closes the paper feed tray, the opening/closing detection unit 404 detects in step S901 that the user opens and closes the paper feed tray. In a case where it is detected in step S901 that the paper feed tray 901 is closed, the process proceeds to step S902. In step S902, the remaining-number-of-sheets detection unit 406 detects the remaining number of sheets of paper after the paper feed tray is closed. This time, the remaining number of sheets of paper after the paper feed tray 1 is closed is "250." In this case, the process proceeds to step S903.

In step S903, the opened state time measuring unit 408 detects a time during which the paper feed tray is opened. The opened state time measuring unit 408 obtains, from the storage unit 307, the paper feed tray opening time for determining whether the paper registration screen is not to be displayed. The paper feed tray opened state time detected by the opened state time measuring unit 408 is compared with the paper feed tray opening time for determining whether the paper registration screen is not to be displayed which is obtained from the storage unit 307. In a case where it is determined as a result of comparison that the paper feed tray opened state time detected by the opened state time measuring unit 408 is shorter than the paper feed tray opening time for determining whether the paper registration screen is not to be displayed which is obtained from the storage unit 307, it is determined that paper replacement is not performed. In this case, the paper feed tray opening time for determining whether the paper registration screen is not to be displayed which is obtained from the storage unit 307 is "5" seconds. Further, the paper feed tray opened state time detected by the opened state time measuring unit 408 is "1" second. In this case, it is determined that paper replacement is not performed, and the process ends. In this manner, in a case where as a result of checking whether the paper feed tray is opened and closed, it becomes clear that paper replacement is not performed to change a paper type, control can be performed not to output an unnecessary paper type registration screen without referring to the registration screen output determining table.

<Flow for Determining Whether to Output the Registration Screen which does not Depend on the Setting Condition in Embodiment 1 (Case C)>

Next, explanation will be made on a use case where the paper feed tray opening button pressing pattern for opening the paper feed tray is a pressing method for outputting the paper type registration screen. In this case, as explained with reference to FIG. 11, the pressing pattern for the opening/closing button of the paper feed tray is associated with the registration screen output. Explanation will be made by taking, as an example, a case where if a predetermined pressing pattern is pressed, the paper type registration screen is output without depending on the setting of the registration screen output determining table shown in FIG. 6. Incidentally, the paper feed trays are in the states shown in FIG. 5, and the registration screen output determining table is the one denoted by the reference numeral 601. Further, the paper feed tray opening time for determining whether the paper registration screen is not to be displayed is stored in the storage unit 307 and is set to be "5" seconds, and the paper feed tray button pressing pattern is set so that the paper registration screen is output at the time of "double-clicking."

The user "double-clicks" to open the paper feed tray 1, retrieves 250 sheets of "A4-size" paper which is already set in the paper feed tray, sets 300 sheets of "A3-size" paper in the paper feed tray, and closes the paper feed tray. Further, a time during which the paper feed tray is opened is equal to or larger than "5" seconds. The process proceeds to steps S901, S902, and S903, but their details have already been described for the case 1, and are omitted.

In step S904, the opening/closing detection unit 404 detects a button pressing method at the time of opening the paper feed tray as detected. The opening/closing detection unit 404 obtains, from the storage unit 307, the paper feed tray opening button pressing pattern for outputting the paper type registration screen. The opening/closing detection unit instructs the registration screen output determining unit 409 to confirm whether the button pressing method at the time of opening the paper feed tray is the button pressing pattern for outputting the paper type registration screen. This time, the detected button pressing method "a double click" at the time of opening the paper feed tray is identical to the button pressing pattern "a double click" for outputting the paper type registration screen, and the process proceeds to step S909.

In step S909, the registration screen output determining unit 409 accesses the storage unit 307, and turns on the flag for registering the type of paper in the paper feed tray 1 which is opened and closed. Then the process proceeds to step S906. Then the process proceeds to steps S906, S907, and S908, but their details have already been explained for the case 2 and are omitted.

In a case where it is necessary to consciously register a paper type in this manner, the paper feed tray pressing pattern is provided, whereby it is possible to output a necessary paper registration screen to the UI panel in a configuration in which an unnecessary paper registration screen is not output to the UI panel.

<Other Embodiments>

In the above-described embodiments, explanation has been made on the examples in which the paper type registration screen is displayed on the UI based on the registration screen output determining table explained with reference to FIG. 6 and the settings explained with reference to FIG. 11. However, only in predetermined cases, it is only necessary to notify the user of the necessity to register a paper type or it is only necessary to display the necessity to register a paper type without displaying the actual registration screen on the UI. Thereafter, the paper type may be registered based on the user's judgment. Further, examples in which the user is notified of the necessity to register a paper type are not limited to the ones in which the screen is displayed on the UI. For example, a message that it is necessary to register a paper type may be output with voice to the user, or a warning sound may be issued, or a warning lamp may be lighted.

Further, in Embodiment 2, explanation has been made by taking, as an example, a case where the paper feed tray button pressing pattern is set to be a single click, a double click, or a long press, and this setting and the pressing pattern are compared to determine whether or not to output the registration screen. However, the pattern of operation by the user does not need to be the paper feed tray button pressing pattern. For example, it is possible to use an example in which a press of the opening/closing button of the paper feed tray is detected in a condition that the paper feed tray is opened or an example in which a paper type change button is provided next to the opening/cloning button of the paper feed tray and a press of this paper type change button is detected.

Further, in Embodiment 2, explanation has been made by taking, as an example, a case where the pressing pattern is set for each paper feed tray in the same manner. However, different settings may be made for respective paper feed trays.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-111274, filed May 29, 2014, which is hereby incorporated by reference wherein in its entirety.

What is claimed is:

1. A sheet processing apparatus comprising:

a sheet storage unit configured to enable itself to be opened and closed;

a display unit configured to display a screen for setting an attribute of a sheet stored in the sheet storage unit;

an obtaining unit including a processor configured to obtain with input from a sensor a remaining number of sheets stored in the sheet storage unit;

a determining unit including a processor configured to determine whether or not to display the screen based on a remaining number of the sheets obtained before the sheet storage unit is opened and a remaining number of the sheets obtained after the sheet storage unit is closed; and a control unit configured to cause the setting screen to be displayed on the display unit based on a result of determination by the determining unit, wherein in a case where the remaining number of the sheets obtained after the sheet storage unit is closed is smaller than the remaining number of the sheets obtained before the sheet unit is opened, the determining unit determines that the screen is to be displayed.

2. A sheet processing apparatus comprising:

a sheet storage unit configured to enable itself to be opened and closed;

a display unit configured to display a screen for setting an attribute of a sheet stored in the sheet storage unit;

an obtaining unit including a processor configured to obtain with input from a sensor a remaining number of sheets stored in the sheet storage unit;

a determining unit including a processor configured to determine whether or not to display the screen based on a remaining number of the sheets obtained before the sheet storage unit is opened and a remaining number of the sheets obtained after the sheet storage unit is closed; and a control unit configured to cause the setting screen to be displayed on the display unit based on a result of determination by the determining unit;

wherein in a case where the remaining number of the sheets obtained after the sheet storage unit is closed is larger than the remaining number of the sheets obtained before the sheet storage unit is opened, the determining unit determines that the screen is not to be displayed.

3. The sheet processing apparatus according to claim 2, further comprising:

a receiver which receives, from a user operation, a determination condition for determining whether or not to display the screen based on the remaining number of the sheets obtained before the sheet storage unit is opened and the remaining number of the sheets obtained after the sheet storage unit is closed, wherein the determining unit determines whether or not to display the screen based on the remaining number of the sheets obtained before the sheet storage unit is opened, the remaining number of the sheets obtained after the sheet storage unit is closed, and the determination condition received by the receiver.

4. A sheet processing apparatus comprising:

a sheet storage unit configured to enable itself to be opened and closed;

a display unit configured to display a screen for setting an attribute of a sheet stored in the sheet storage unit;

a size detector provided on the sheet storage unit, which detects the size of a sheet stored at the storage unit;

a determining unit including a processor configured to determine whether or not to display the screen based on a detection by the size detector; and a control unit configured to cause the setting screen to be displayed on the display unit based on a result of determination by the determining unit, wherein in a case where the size of a sheet stored in the sheet storage unit detected by the size detector after the sheet storage unit is closed is different from the size of a sheet stored in the sheet storage unit detected by the size detector before the sheet unit is opened, the determining unit determines that the screen is to be displayed.

5. A sheet processing apparatus comprising:

a sheet storage unit configured to enable itself to be opened and closed;

a display unit configured to display a screen for setting an attribute of a sheet stored the sheet storage unit;

a determining unit including a processor configured to determine whether or not to display the screen based on a time from opening of the sheet storage unit to closing of the sheet storage unit; and a controlling unit configured to cause the setting screen to be displayed on the display unit based on a result of determination by the determining unit, wherein in a case where the time from opening of the sheet storage unit to closing of the sheet storage unit is longer than a predetermined time, the determining unit determines that the screen is to be displayed.

6. The sheet processing apparatus according to claim 5, further comprising a receiver which receives the predetermined time from a user operation.

7. The sheet processing apparatus according to claim 5, wherein the determining unit is further configured to determine whether or not to display the screen based on a pattern of operation performed to open the sheet storage unit as well as the time from opening of the sheet storage unit to closing of the sheet storage unit.

8. A method for controlling a sheet processing apparatus comprising a sheet storage unit configured to enable itself to be opened and closed and a display unit configured to display a screen for setting an attribute of a sheet stored in the sheet storage unit, the method comprising:

obtaining with input from a sensor a remaining number of sheets stored in the sheet storage unit;

determining whether or not to display the screen based on a remaining number of the sheets obtained before the sheet storage unit is opened and a remaining number of the sheets obtained after the sheet storage unit is closed; and performing control based on a result of determination in the determining step so as to cause the setting screen to be displayed on the display unit, wherein in a case where the remaining number of the sheets obtained after the sheet storage unit is closed is smaller than the remaining number of the sheets obtained before the sheet storage unit is opened, the determining step determines that the screen is to be displayed.

9. A method for controlling a sheet processing apparatus comprising a sheet storage unit configured to enable itself to be opened and closed and a display unit configured to display a screen for setting an attribute of a sheet stored in the sheet storage unit, the method comprising:

obtaining with input from a sensor a remaining number of sheets stored in the sheet storage unit;

determining whether or not to display the screen based on a remaining number of sheets obtained before the sheet storage unit is opened and a remaining number of sheets obtained after the sheet storage unit is closed; and performing control based on a result of determination in the determining step so as to cause the setting screen to be displayed on the display unit, wherein in a case where the remaining number of the sheets obtained after the sheet storage unit is closed is larger than the remaining number of the sheets obtained before the sheet storage unit is opened, the determining step determines that the screen is to be displayed.

10. A method for controlling a sheet processing apparatus comprising a sheet storage unit configured to enable itself to be opened and closed and a display unit configured to display a screen for setting an attribute of a sheet stored in the sheet storage unit, the method comprising:

detecting with a size detecting unit a size of a sheet stored in the sheet storage unit, determining whether or not to display the screen based on a detection by the detection step; and performing control based on a result of determination in the determining step, wherein in a case where the size of a sheet stored in the sheet storage unit detected by the detecting step after the sheet storage unit is closed is different from the size of a sheet stored in the sheet storage unit detected by the detecting step before the sheet unit is opened, the determining step determines the screen to be displayed.

11. A method for controlling a sheet processing apparatus comprising a sheet storage unit configured to enable itself to be opened and closed and a display unit configured to display a screen for setting an attribute of a sheet stored in the sheet storage unit, the method comprising:

determining whether or not to display the screen based on a time from opening of the sheet storage unit to closing of the sheet storage unit; and performing control based on a result of determination in the determining step so as to cause the setting screen to be displayed on the display unit, wherein in a case where the time from opening of the sheet storage unit to closing of the sheet storage unit is longer than a predetermined time, the determining step determines that the screen is to be displayed.

* * * * *